US012620406B2

(12) United States Patent
Kruchinin et al.

(10) Patent No.: US 12,620,406 B2

(45) Date of Patent: May 5, 2026

(54) SYSTEM AND METHOD FOR SPEECH ENHANCEMENT IN MULTICHANNEL AUDIO PROCESSING SYSTEMS

(71) Applicant: Microsoft Technology Licensing, LLC, Redmond, WA (US)

(72) Inventors: Stanislav Kruchinin, Vienna (AT); Dushyant Sharma, Mountain House, CA (US); Rong Gong, Vienna (AT)

(73) Assignee: Microsoft Technology Licensing, LLC., Redmond, WA (US)

( * ) Notice: Subject to any disclaimer, the term of this patent is extended or adjusted under 35 U.S.C. 154(b) by 97 days.

(21) Appl. No.: 18/466,711

(22) Filed: Sep. 13, 2023

(65) Prior Publication Data

US 2025/0087230 A1 Mar. 13, 2025

(51) Int. Cl.

*G10L 21/16* (2013.01)
*H04S 7/00* (2006.01)

(52) U.S. Cl.

CPC ................ *G10L 21/16* (2013.01); *H04S 7/30* (2013.01); *H04S 2400/03* (2013.01)

(58) Field of Classification Search

CPC ......... G10L 21/16; H04S 7/30; H04S 2400/03
See application file for complete search history.

(56) References Cited

U.S. PATENT DOCUMENTS

| | | | | |
|---|---|---|---|---|
| 2005/0165587 | A1* | 7/2005 | Cheng | G06F 17/147 704/E19.02 |
| 2011/0103591 | A1* | 5/2011 | Ojala | G10L 19/008 381/17 |
| 2011/0311061 | A1* | 12/2011 | Oshikiri | G10L 19/008 381/17 |
| 2013/0272539 | A1* | 10/2013 | Kim | G01S 15/876 381/92 |
| 2015/0296319 | A1* | 10/2015 | Shenoy | H04R 3/005 381/303 |
| 2022/0399026 | A1* | 12/2022 | Gong | H04R 3/005 |
| 2023/0253000 | A1* | 8/2023 | Kono | G10L 19/008 704/500 |
| 2024/0048902 | A1* | 2/2024 | Vilermo | H04S 7/30 |
| 2024/0118363 | A1* | 4/2024 | Yasuda | G10L 25/51 |

OTHER PUBLICATIONS

Shuai, Chenhao, et al. "mdctGAN: Taming transformer-based GAN for speech super-resolution with modified DCT spectra." arXiv preprint arXiv:2305.11104 (2023). (Year: 2023).*

(Continued)

*Primary Examiner* — Brian L Albertalli
(74) *Attorney, Agent, or Firm* — Foley IP Law, PLLC

(57) ABSTRACT

A method, computer program product, and computing system for enhancement of audio signals received from a plurality of microphones. A multichannel audio signal is received from a plurality of microphones and is processed with a short-time discrete cosine transform (STDCT) to generate a real-valued spectral representation of the multichannel signal encoding both magnitude and phase information. Magnitude- and phase-dependent weights are generated, and an enhanced single-channel signal is produced based upon, at least in part, the spectral representation of the multichannel signal and the magnitude- and phase-dependent weights.

18 Claims, 8 Drawing Sheets

600

(56) References Cited

OTHER PUBLICATIONS

Zeghidour, Neil, et al. "Soundstream: An end-to-end neural audio codec." IEEE/ACM Transactions on Audio, Speech, and Language Processing 30 (2021): 495-507. (Year: 2021).*
Li, Qinglong, et al. "Real-time monaural speech enhancement with short-time discrete cosine transform." arXiv preprint arXiv: 2102.04629 (2021). (Year: 2021).*
Wang, Ye, Miikka Vilermo, and Leonid Yaroslavsky. "Energy compaction property of the MDCT in comparison with other transforms." Audio Engineering Society Convention 109. Audio Engineering Society, 2000. (Year: 2000).*
Geng, Chuang, and Lei Wang. "End-to-end speech enhancement based on discrete cosine transform." 2020 IEEE International Conference on Artificial Intelligence and Computer Applications (ICAICA). IEEE, 2020. (Year: 2020).*
Chen, Shuixian, Ruimin Hu, and Shuhua Zhang. "Estimating spatial cues for audio coding in MDCT domain." 2009 IEEE International Conference on Multimedia and Expo. IEEE, 2009. (Year: 2009).*
Zhang, Shuhua, Weibei Dou, and Huazhong Yang. "MDCT sinusoidal analysis for audio signals analysis and processing." IEEE transactions on audio, speech, and language processing 21.7 (2013): 1403-1414. (Year: 2013).*
Mariotte, Théo, et al. "Microphone array channel combination algorithms for overlapped speech detection." Interspeech 2022 Human and Humanizing Speech Technology. 2022. (Year: 2022).*
Koizumi, Yuma, et al. "End-to-end sound source enhancement using deep neural network in the modified discrete cosine transform domain." 2018 IEEE International Conference on Acoustics, Speech and Signal Processing (ICASSP). IEEE, 2018. (Year: 2018).*
Cheng, Corey. "Method for estimating magnitude and phase in the MDCT domain." Audio Engineering Society Convention 116. Audio Engineering Society, 2004. (Year: 2004).*
Jones, Daniel T., et al. "Microphone array coding preserving spatial information for cloud-based multichannel speech recognition." 2022 30th European Signal Processing Conference (EUSIPCO). IEEE, 2022. (Year: 2022).*

* cited by examiner

SYSTEM AND METHOD FOR SPEECH ENHANCEMENT IN MULTICHANNEL AUDIO PROCESSING SYSTEMS

BACKGROUND

Speech processing systems (e.g., automatic speech recognition (ASR) systems, bio-metric voice systems, etc.) suffer recognition accuracy degradation from the input of a far-field audio signal when the speakers are distant from the microphone. The degradation of recognition quality is due to the signal corruption effect of the far-field speech caused by reverberation and background noise. Compared with a single microphone, a microphone array device which comprises multiple microphones can be utilized to capture multichannel audio as the input to a speech processing backend system (e.g., an ASR backend system) for alleviating such a degradation problem. However, since a speech processing backend is usually designed to receive a single-channel audio input, a speech processing frontend component which receives the multichannel audio and emits a single-channel audio may be utilized to bridge the gap between the multichannel audio input and the speech processing backend.

Multichannel signals may be processed by an ASR system to transcribe or otherwise process conversational speech. Spatial information contained in the multichannel audio can enhance the system's ability to accurately capture the nuances of conversational speech, enabling more robust transcription and analysis. Speech processing methods considering this information are particularly beneficial in scenarios where distinguishing between multiple speakers or capturing environmental cues is desirable for the transcription process.

BRIEF DESCRIPTION OF THE DRAWINGS

Like reference symbols in the various drawings indicate like elements.

DETAILED DESCRIPTION

As will be discussed in greater detail below, implementations of the present disclosure address the problems of effective utilization of a multichannel (e.g., microphone array) edge device to capture a distant speech signal and usage of spatial information in an efficient way to enhance the signal for an end-to-end ASR system. One aspect regarding solving the distant ASR problem lies in the employment of microphone arrays and the exploitation of spatial information to improve signal quality.

Microphone arrays include multiple microphones spaced apart by known distances and relative positions. Therefore, the array is capable of capturing multichannel audio signals which contain spatial information. Spatial information in a microphone array refers to the location and orientation of individual microphones relative to each other within the array, as well as the sound sources in the surrounding environment. This spatial arrangement of microphones enables the array to capture and analyze audio signals from different directions, providing valuable cues for various audio processing applications. Microphone arrays with well-defined spatial arrangements are particularly beneficial in challenging audio environments where noise, reverberation, and multiple sound sources are present.

However, since ASR systems are configured to process single-channel signals, the spatial information contained in a multichannel signal needs to be accessible when the multichannel signal is transformed into a single-channel signal for processing by the ASR system.

A Short-Time Discrete Cosine Transform and, particularly, the Modified Discrete Cosine Transform (MDCT) is used to generate a time-frequency representation (i.e., the individual channel's spectrum) of the multichannel audio signal in a speech enhancement frontend for ASR. This representation includes encoded phase information within a real-valued representation of the spectrum, which results in better speech enhancement because the neural network computes the magnitude- and phase-dependent weights similar to weights computed in beamforming processes. This representation also facilitates reconstruction of the time-domain waveform of the enhanced signal and extracting spatial information, e.g., direction of arrival (DOA), from the computed weights.

The details of one or more implementations are set forth in the accompanying drawings and the description below. Other features and advantages will become apparent from the description, the drawings, and the claims.

The Multichannel Signal Enhancement Process

Figure 1:
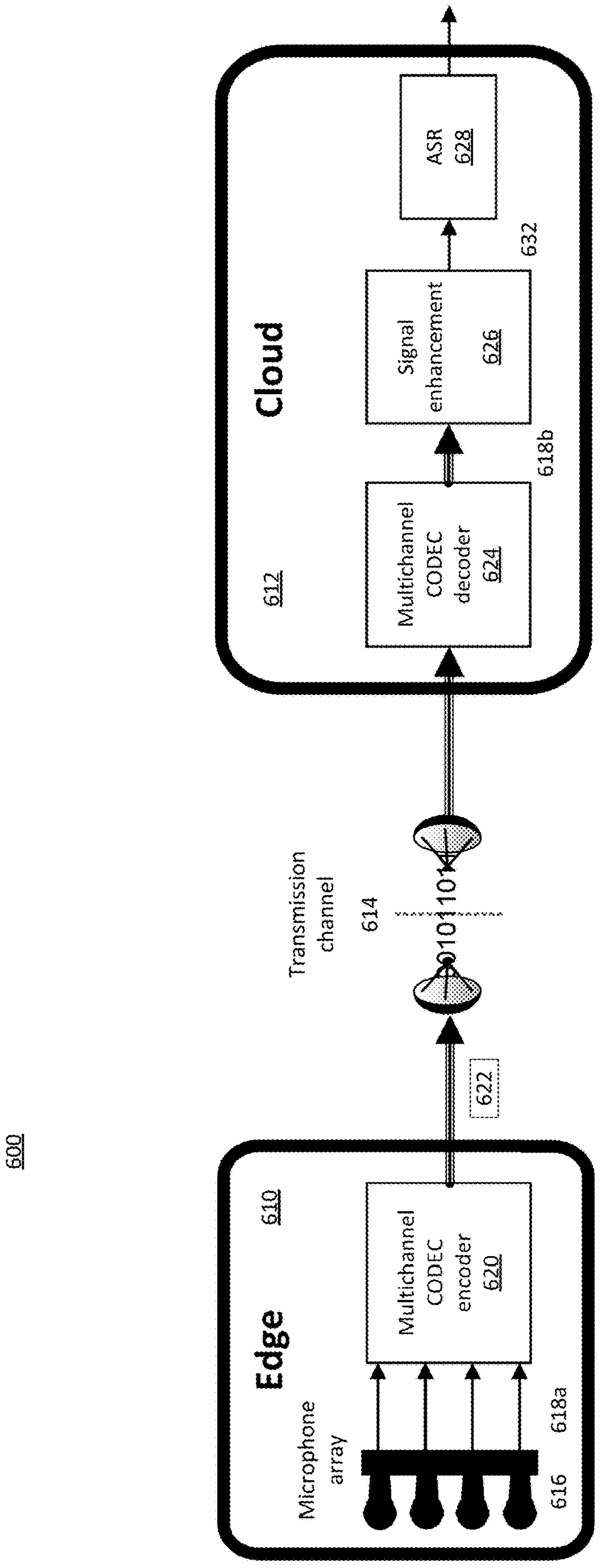
FIGS. 1-4 are diagrammatic views of various audio codecs in accordance with the implementation of a multichannel audio signal enhancement process.
Figure 2:
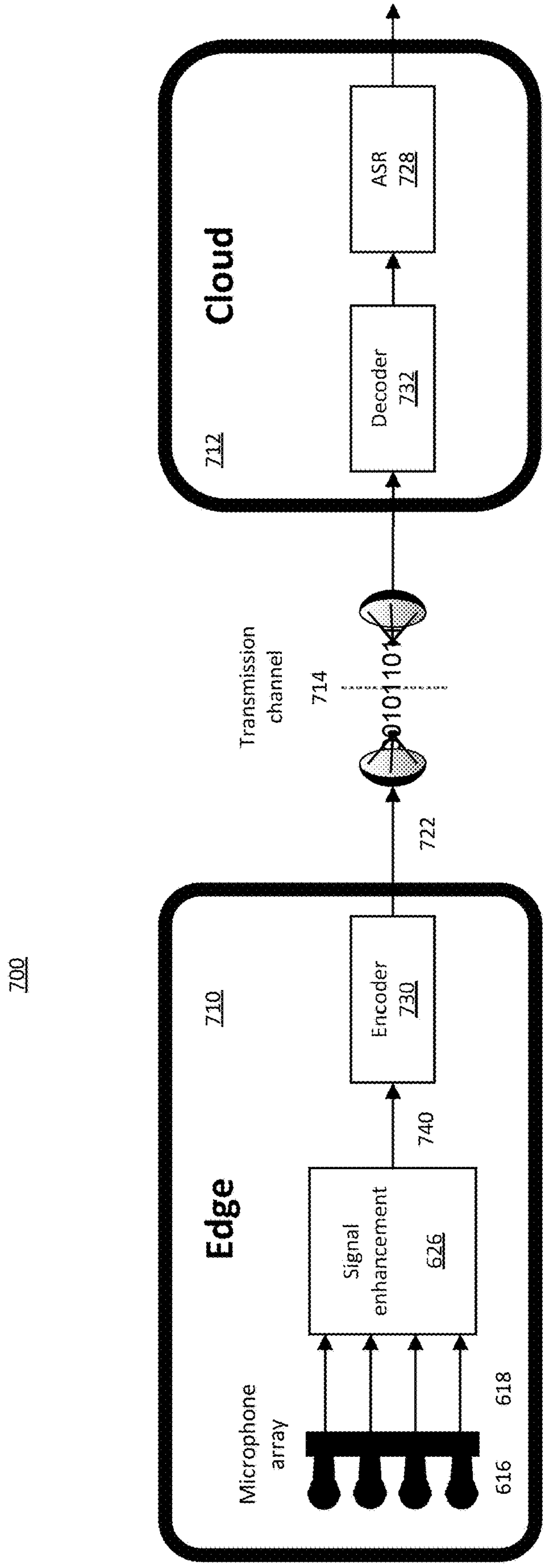

Referring to FIGS. 1-7, implementations of the present disclosure are directed to a multichannel signal enhancement method and system using the spatial information encoded in a phase-dependent signal to enhance the automatic speech recognition process. This enables more precise information regarding the location of the source of an audio signal received at the microphone array to be determined. Referring to FIG. 1, multichannel audio codec 600 includes an edge device 610 having a microphone array 616 including a plurality of microphones. The microphone array 616 outputs a plurality of audio signals 618*a* to a multichannel codec encoder 620, to encode a multichannel signal 622 for sending over transmission channel 614. Once received at multichannel codec decoder 624 in cloud device 612, multichannel signal 622 is decoded into multichannel signal 618*b* for processing by audio signal enhancement device 626. As is described in greater detail below, signal enhancement device 626 processes the multichannel signal 618*b*, extracts information from the multichannel signal 618*b*, and combines the multichannel signal into a single-channel enhanced signal 632 for processing by ASR system 628. For reference, solid signal lines in the figures represent single-channel signals and non-solid lines represent multi-channel signals.

In the implementation shown in FIG. 1 and described herein, multichannel audio codec 600 includes audio signal enhancement device 626 which is included in cloud device 612. In another implementation of the present disclosure, shown in FIG. 2, the multichannel signals 618 are processed in multichannel audio codec 700 by the audio signal enhancement device 626 in the edge device 710, resulting in a single-channel enhanced signal 740, which is encoded in encoder 730 to generate encoded single-channel signal 722. Single-channel signal 722 is transmitted to the cloud device 712 over transmission channel 714. The single-channel signal 722 is decoded in decoder 732 and provided to ASR system 728 for processing. As shown in the various implementations, the audio signal enhancement device 626 is situated in either the edge device 610/710 or the cloud device 612/712. The operation of the device audio signal enhancement device 626 is the same, regardless of which of the edge device 610/710 and cloud device 612/712 it is configured in.

Figure 5:
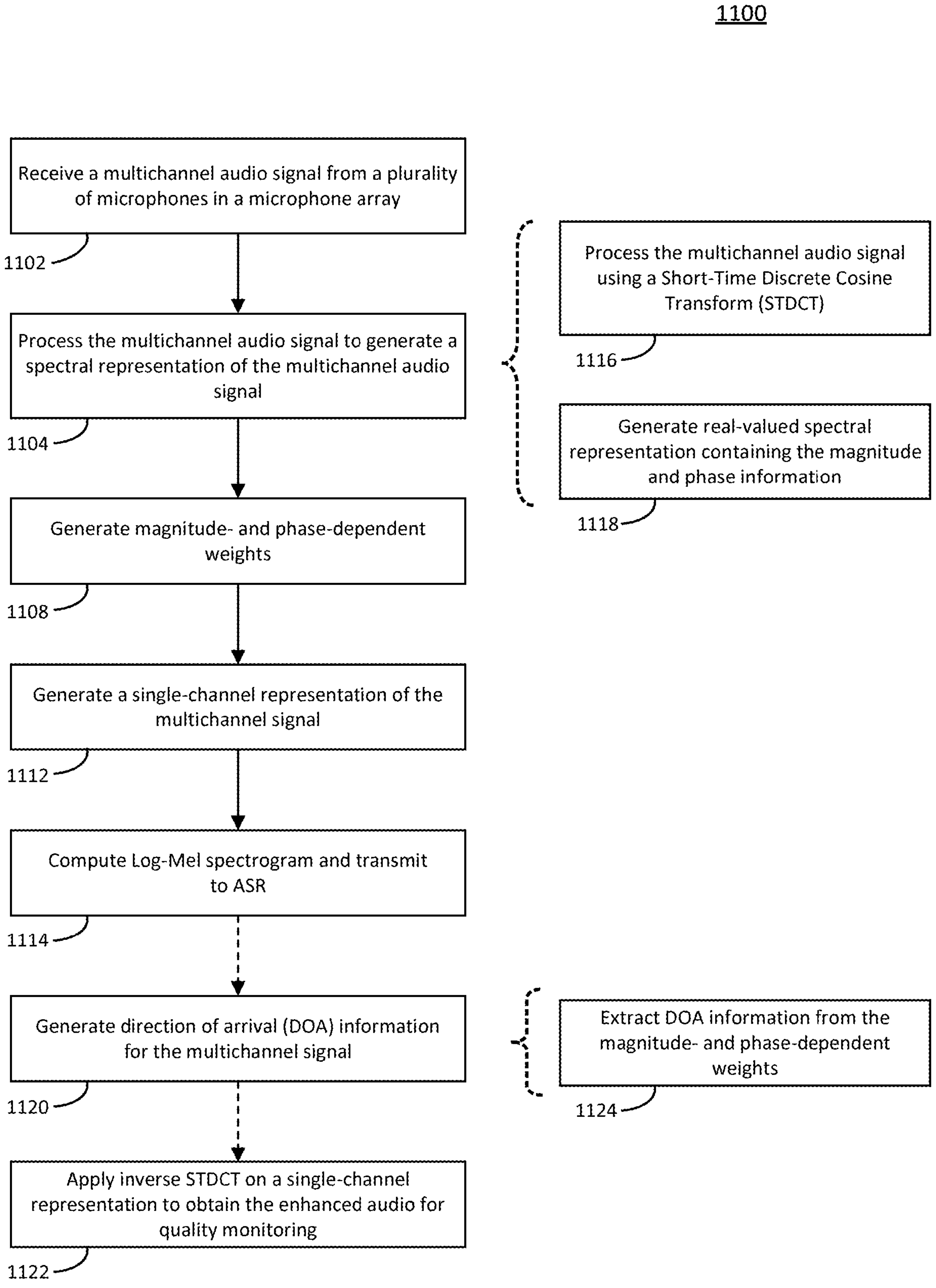
FIG. 5 is a flow chart of one implementation of the audio signal enhancement process.

Referring to FIG. 5, in an implementation of the present disclosure, in the audio codec process 1100, a multichannel audio signal is received from a plurality of microphones in a microphone array 616, 1102. The multichannel audio signal 618, 618*a* is processed to generate a spectral representation of the multichannel audio signal, 1104. In some implementations, processing 1104 comprises processing the multichannel signal using a Short-Time Discrete Cosine Transform (STDCT), 1116, to perform audio signal enhancement with real-valued spectrograms containing magnitude and phase information, 1118. STDCT takes a sequence of data points from an audio signal in the time domain and transforms it into a set of coefficients that represent the signal's frequency content. Several versions of the STDCT are available to process the multichannel audio signals in the manner described herein. However, in an implementation of the present disclosure, the modified DCT (MDCT), a memory compact version of STDCT commonly applied in audio codecs, is used as the spectral representation of the multichannel audio signal. Varieties of this transform include either a standard floating-point or integer MDCT (IntMDCT), depending on the audio codec and computational capacities of the user device. Other types of transforms which could be used as a basis of a spectral representation include, but are not limited to, the DCT of types I, II, III, and IV. In an alternate implementation, the discrete sine transform (DST) is used in the implementation of the present disclosure.

As described, implementations of the present disclosure employ the modified discrete cosine transform (MDCT) for processing the multichannel audio signal to generate the spectral representation of the multichannel audio signal. The MDCT is performed according to the following equation (1):

$$X_m^t = \sum_{n=0}^{2N-1} w_n x_n^t \cos\left[\frac{\pi}{N}\left(n + \frac{1}{2} + \frac{N}{2}\right)\left(m + \frac{1}{2}\right)\right], \quad m = 0, 1, \ldots, N-1. \tag{1}$$

Here, $$x_n^t$$

is the block of 2N samples used for calculation of the MDCT frame $$X_m^t;$$

$w_n$ is the symmetric window function of length 2N;

N is the total number of MDCT components (size of the transform);

t is the MDCT frame index;

n is the waveform sample index; and m is the MDCT component index.

Magnitude- and phase-dependent weights are generated from a spectral representation of the multichannel audio by a DNN for signal enhancement, 1108. In an implementation, the DNN is jointly trained with the downstream ASR model and the weights are a periodically updated tensor of the shape (B, T, C, N), where B is the batch size, Tis the number of MDCT frames, C is the number of channels, and N is defined with reference to equation (1). A single-channel representation of the multichannel signal is generated, 1112, by performing an element-wise product of the magnitude- and phase-dependent weights and the spectral representation of the multichannel signal and summing over a channel dimension to collapse the multiple channels into a single channel. In an implementation, the Log-Mel spectrogram of the single-channel representation, 1114, is calculated, which is then transmitted to the ASR model for processing. In other implementations, a raw STDCT spectrogram is processed, or the single-channel spectrum is converted back to the waveform, depending on requirements of the downstream ASR model. As such, the downstream ASR may include one of a number of known systems that operate on a range of features, including the Mel filterbank coefficients.

Since, as described above, the STDCT transform implicitly encodes the phase information of the multichannel audio signal, the system is able to determine direction of arrival (DOA) information, 1120, from the magnitude- and phase-dependent weights, 1124. The DOA information is of the type that enables an indication of not just the general direction from which the source of a signal originated based on which microphone in the monitored space captured the audio, but a more precise indication of the angle of incidence of the audio signal at the receiving microphone. For different microphone geometries, this will include corresponding spatial information, e.g., in the case of a linear array, the DOA information may indicate that an audio signal received and processed by the system 10 originated at an azimuth angle relative to the array of, for example, 20° to the left. Such information facilitates speaker localization and/or speaker diarization for one or more speakers in the monitored space. For certain other microphone array geometries, the DOA information may also allow for determination of elevation information of the speaker relative to the array.

The distinctions in microphone signals caused by various propagation paths between the acoustic signal source and microphones in an array encapsulate spatial information about sound sources. This information is preserved in the multichannel STDCT spectrograms and is used for signal enhancement.

Another feature of STDCT is that it is real-valued and invertible. This allows obtaining an enhanced audio signal corresponding to the enhanced time-domain waveform for listening or speech quality monitoring without applying computationally expensive methods for phase reconstruction. In the implementation using the MDCT, an inverse MDCT (IMDCT) is performed on the single-channel representation to obtain the enhanced audio signal, 1122. The IMDCT is defined by:

$$x_n^t = \frac{2}{N} w_n \sum_{m=0}^{N-1} X_m^t \cos\left[\frac{\pi}{N}\left(n + \frac{1}{2} + \frac{N}{2}\right)\left(m + \frac{1}{2}\right)\right], \quad n = 0, 1, \ldots, 2N-1, \tag{2}$$

where the variables are as indicated with reference to equation (1).

Figure 3:
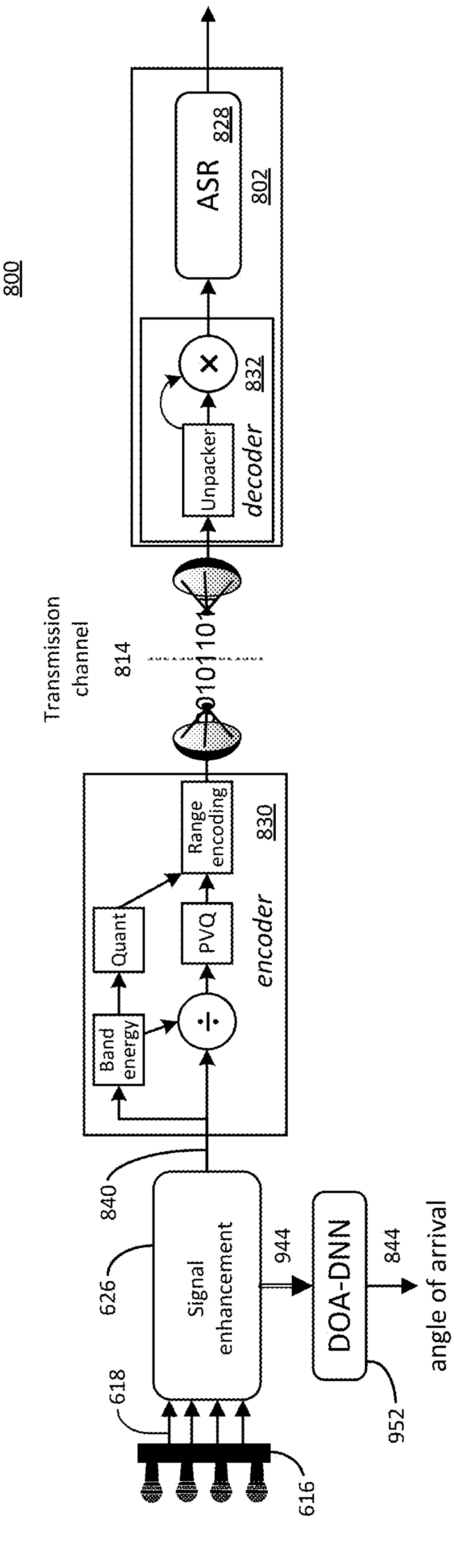

Referring to FIG. 3, a codec 800 includes a plurality of microphones in an array 616, which captures audio signals from a monitored space and outputs a multichannel signal 618 to the audio signal enhancement device/self-attention channel combinator 626. Self-attention channel combinator 626 combines the multichannel signal 618 with generated magnitude- and phase-dependent weights to generate a single-channel representation 840 of the multichannel signal 618. Single-channel representation 840 is encoded in encoder 830 before being transmitted to decoder 832 over transmission channel 814. The MDCT-based output from the Self-attention channel combinator 626 aligns with the native representation of commonly used audio codecs like AAC, G.7xx, and CELT (a component of Opus), enabling a novel method of performing signal enhancement using multiple microphones and transmitting through existing single-channel audio codec infrastructure. Encoder 830 of codec 800 incorporates a modified version of CELT.

MDCT is employed in most modern audio compression standards, including MP3, Dolby Digital (AC-3), Ogg Vorbis, Opus (CELT), Windows Media Audio (WMA), Advanced Audio Coding (AAC), AAC-LD (LD-MDCT), High-Definition Coding (HDC), LDAC, Dolby AC-4, and MPEG-H 3D Audio, as well as in a family of speech compression standards G.7xx.

As described above, since the phase information is maintained with the STDCT, the magnitude- and phase-dependent weights derived from the multichannel audio signal representation are processed by a deep neural network (DNN) 952 to generate the DOA information 844 and provide it as metadata for the cloud device to use for localization purposes such as diarization. DNN 952 is a neural network that uses the magnitude- and phase-dependent weights to calculate a distribution of the weights across each channel to determine the direction of the received audio signal.

The encoded single-channel representation is transmitted over transmission channel 814 to cloud device 802 including decoder 832 and ASR device 828. In cloud device 802, the signal is decoded and input to ASR 828. In the case where a modified audio codec (like CELT) was used in the encoder, the signal does not need to be decoded completely to the time domain, in which case an unpacker reconstructs the MDCT spectrogram and feeds it directly to ASR 828. Depending on the input format of the downstream ASR model, a Log-Mel spectrogram or any other features of the single-channel representation may be calculated.

Figure 4:
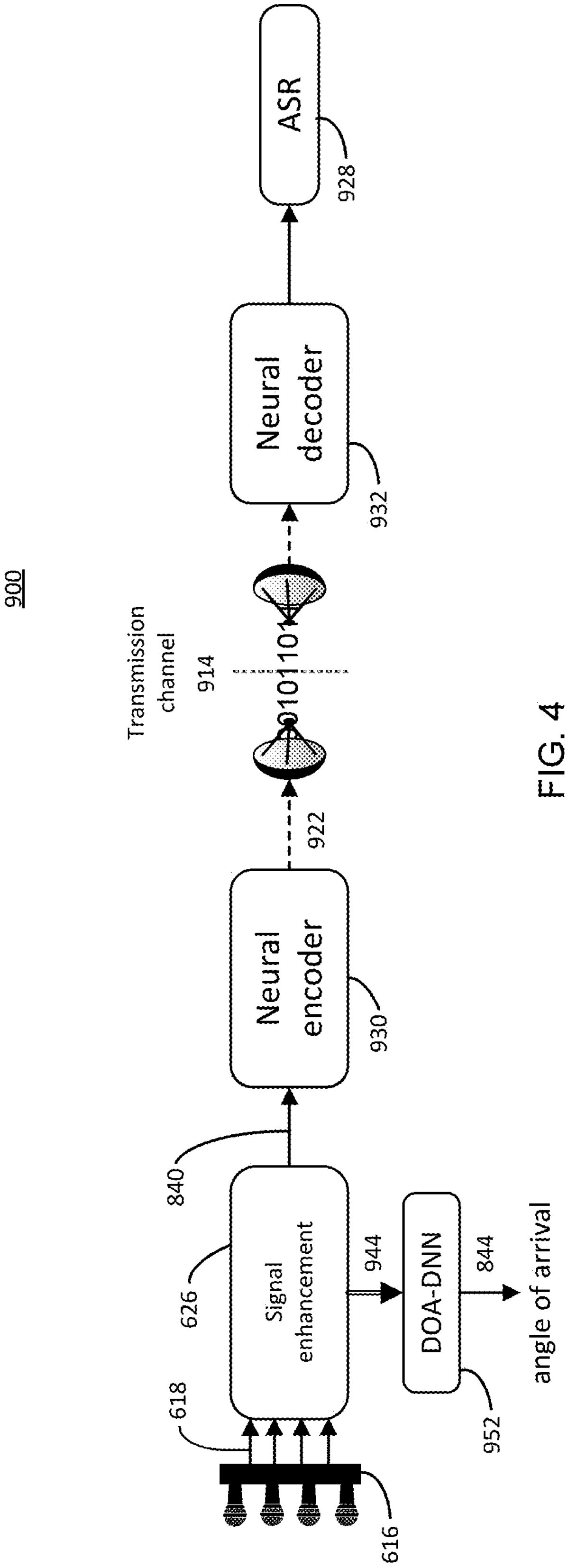

Referring to FIG. 4, codec 900 includes audio signal enhancement device 626, DNN 952 and ASR 928, similar to codec 800. However, in this implementation, neural encoder 930 and neural decoder 932 are trained to encode and decode the single-channel representation signal 840 and 922, respectively, to optimize the overall cost function of the speech processing operation.

Figure 6:
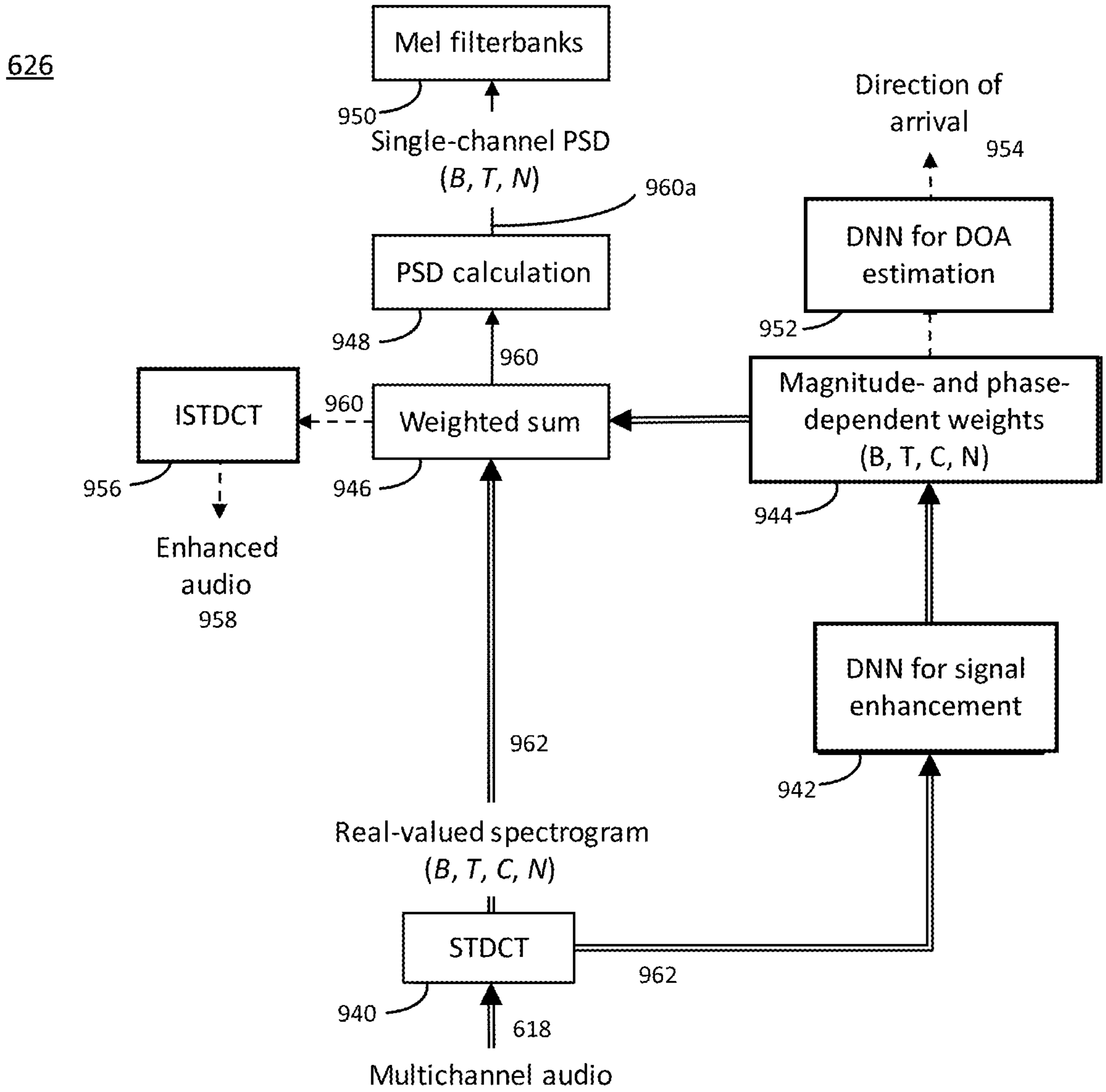
FIG. 6 is a diagrammatic view of an implementation of the audio signal enhancement process.

Referring to FIG. 6, an implementation of the audio signal enhancement device 626 according to the present disclosure receives a multichannel audio signal 618 from a microphone array (not shown). The multichannel audio signal includes batch (B), time (T), and channel (C) components. STDCT is applied to the multichannel audio signal 618 at block 940. As discussed above, the STDCT transform of any type could be used, and for the purposes of this disclosure they are referred to as Short-Time Discrete Cosine Transform (STDCT). The STDCT yields a real-valued spectral representation 962 including batch (B), time (T), channel (C), and STDCT (N) components. As described herein, in an implementation of the present disclosure, the modified DCT (MDCT) is used because it facilitates the use of a real-valued and invertible spectral representation throughout the signal processing pipeline.

Spectral representation 962 is processed in DNN 942 to extract magnitude information and phase information associated with the multichannel audio signal 618. Magnitude- and phase-dependent weights are generated, 944. A weighted sum 946 is performed on the spectral representation 962 using the magnitude- and phase-dependent weights to combine the multichannel representation into a single-channel representation 960 of the input multichannel audio signal 618. A power spectral density calculation $PSD(x)=|x|^2$ is performed on the single-channel representation 960 to produce a single-channel PSD signal 960*a*, which includes batch (B), time (T), and STDCT (N) components. In some implementations, the Log-Mel spectrogram 950 is derived from the single-channel PSD 960*a* and provided to an ASR system (not shown) for processing.

As described above, to obtain an enhanced audio signal, 958, representative of the multichannel audio signal 618, an inverse STDCT (ISTDCT) is performed, 956, on the single-channel representation 960. Further, the magnitude- and phase-dependent weights are processed by a deep neural network (DNN) 952 to obtain direction of arrival (DOA) information 954 for the multi-channel audio signal 618. In an example, DNN 952 is trained (for example in a supervised manner with labeled data) to map the STDCT weights to a DOA estimate.

Figure 7:
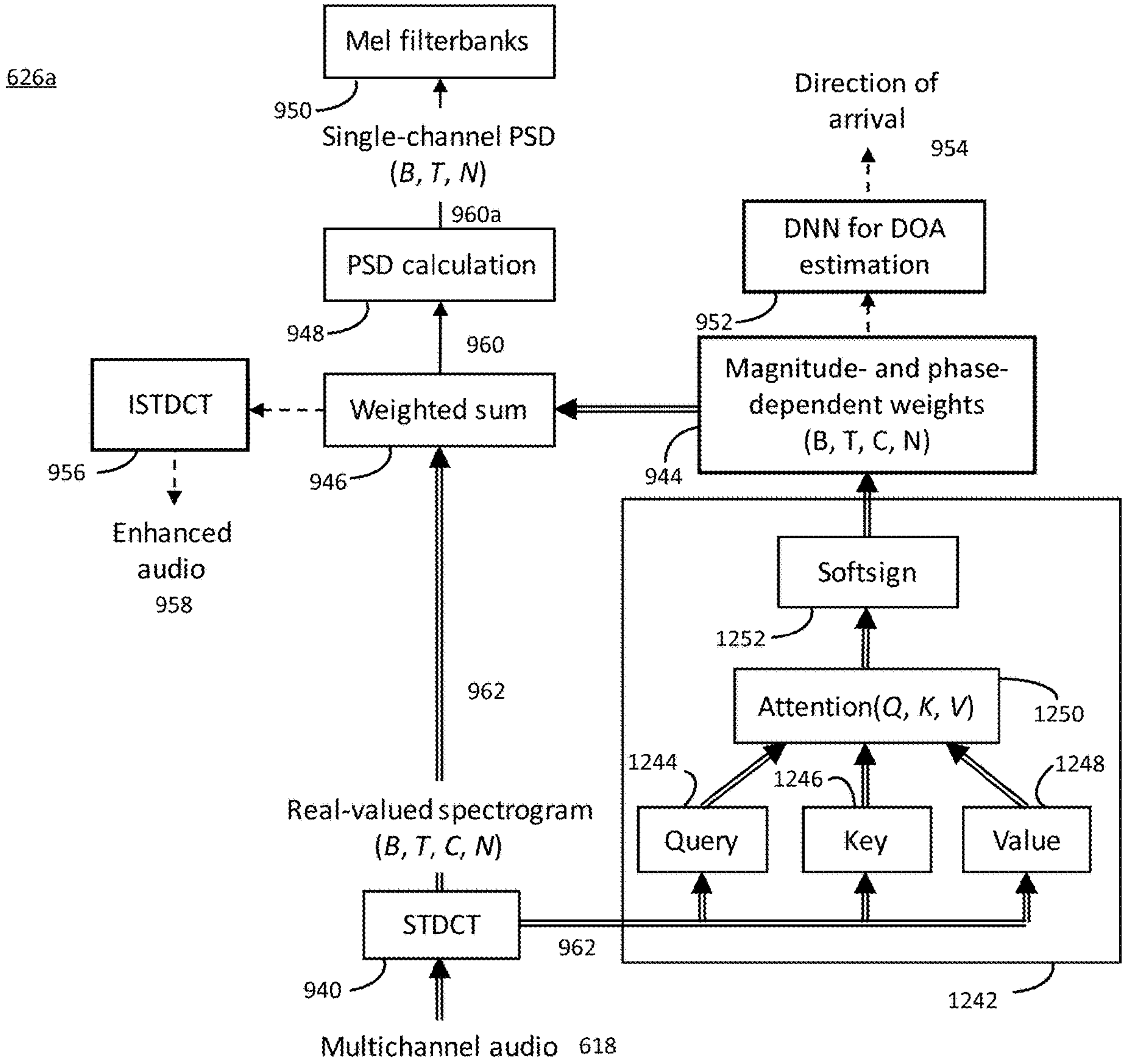
FIG. 7 is a further diagrammatic view of an implementation of the audio signal enhancement process of FIG. 6.

Referring to FIG. 7, an example implementation of audio signal enhancement/SACC device 626*a* according to the present disclosure including an implementation of the DNN for signal enhancement component 942 (FIG. 6) is shown. The remaining components are identical to the components with like reference numerals of device 626 in FIG. 6 Signal enhancement component 1242 defines Query 1244, Key 1246, and Value 1248 components associated with the multichannel signal by performing linear transformations on the spectral representation 962 of multichannel audio signal 618. An attention mechanism 1250 processes the Query, Key, and Value information calculated by corresponding dense layers and a softsign activation function 1252 is applied to convert the outputs of the attention mechanism 1250 to a value from −1 to +1 to determine the magnitude- and phase-dependent weights for each channel. As described above, these weights are used both in the weighted sum operation 946 and for the DOA estimation 952.

System Overview

Figure 8:
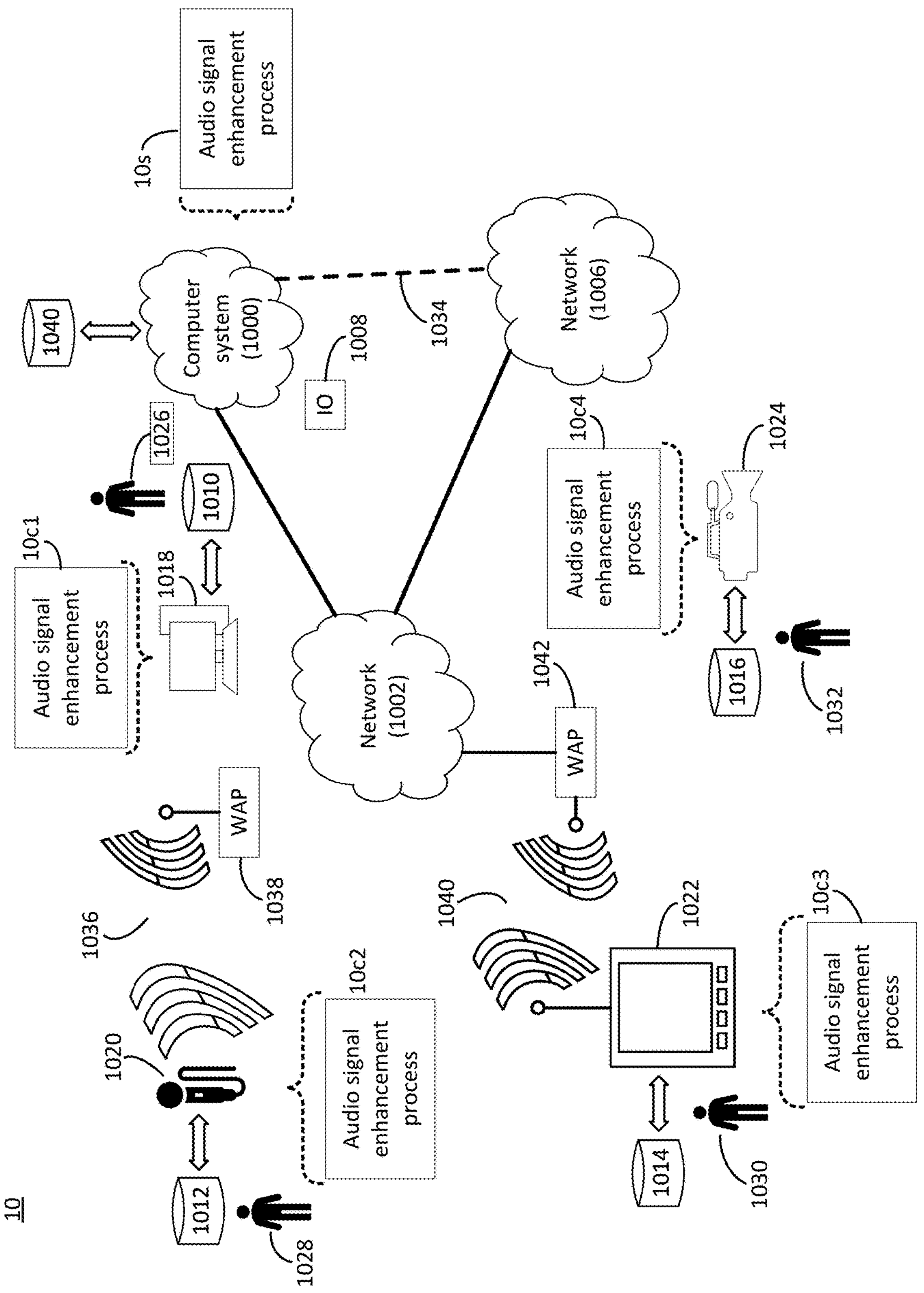
FIG. 8 is a diagrammatic view of a computer system and the audio signal enhancement process coupled to a distributed computing network.

Referring to FIG. 8, there is shown signal enhancement process 10. Audio signal enhancement process 10 may be implemented as a server-side process, a client-side process, or a hybrid server-side/client-side process. For example, audio signal enhancement process 10 may be implemented as a purely server-side process via audio signal enhancement process 10*s*. Alter-natively, audio signal enhancement process 10 may be implemented as a purely client-side process via one or more of audio signal enhancement process 10*c*1, audio signal enhancement process 10*c*2, audio signal enhancement process 10*c*3, and audio signal enhancement process 10*c*4. Alter-natively, audio signal enhancement process 10 may be implemented as a hybrid server-side/client-side process via audio signal enhancement process 10*s* in combination with one or more audio signal enhancement process 10*c*1, audio signal enhancement process 10*c*2, audio signal enhancement process 10*c*3, and audio signal enhancement process 10*c*4.

Accordingly, audio signal enhancement process 10 as used in this disclosure may include any combination of audio signal enhancement process 10*s*, audio signal enhancement process 10*c*1, audio signal enhancement process 10*c*2, audio signal enhancement process 10*c*3, and audio signal enhancement process 10*c*4.

Audio signal enhancement process 10*s* may be a server application and may reside on and may be executed by a computer system 1000, which may be connected to network 1002 (e.g., the Internet or a local area network). Computer system 1000 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a minicomputer, a mainframe computer, a RAID device, and a NAS system. The various components of computer system 1000 may execute one or more operating systems.

The instruction sets and subroutines of audio signal enhancement process 10*s*, which may be stored on storage device 1004 coupled to computer system 1000, may be executed by one or more processors (not shown) and one or more memory architectures (not shown) included within computer system 1000. Examples of storage device 1004 may include but are not limited to: a hard disk drive; a RAID device; a random-access memory (RAM); a read-only memory (ROM); and all forms of flash memory storage devices.

Network 1002 may be connected to one or more secondary networks (e.g., network 1004), examples of which may include but are not limited to: a local area network; a wide area network; or an intranet, for example.

Various IO requests (e.g., IO request 1008) may be sent from audio signal enhancement process 10*s*, audio signal enhancement process 10*c*1, audio signal enhancement process 10*c*2, audio signal enhancement process 10*c*3 and/or audio signal enhancement process 10*c*4 to computer system 1000. Examples of IO request 1008 may include but are not limited to data write requests (i.e., a request that content be written to computer system 1000) and data read requests (i.e., a request that content be read from computer system 1000).

The instruction sets and subroutines of audio signal enhancement process 10*c*1, audio signal enhancement process 10*c*2, audio signal enhancement process 10*c*3 and/or audio signal enhancement process 10*c*4, which may be stored on storage devices 1010, 1012, 1014, 1016 (respectively) coupled to client electronic devices 1018, 1020, 1022, 1024 (respectively), may be executed by one or more processors (not shown) and one or more memory architectures (not shown) incorporated into client electronic devices 1018, 1020, 1022, 1024 (respectively). Storage devices 1010, 1012, 1014, 1016 may include but are not limited to: hard disk drives; optical drives; RAID devices; random access memories (RAM); read-only memories (ROM), and all forms of flash memory storage devices. Examples of client electronic devices 1018, 1020, 1022, 1024 may include, but are not limited to, personal computing device 1018 (e.g., a smart phone, a personal digital assistant, a laptop computer, a notebook computer, and a desktop computer), audio input device 1020 (e.g., a handheld microphone, a lapel microphone, an embedded microphone (such as those embedded within eyeglasses, smart phones, tablet computers and/or watches) and an audio recording device), display device 1022 (e.g., a tablet computer, a computer monitor, and a smart television), a hybrid device (e.g., a single device that includes the functionality of one or more of the above-references devices; not shown), an audio rendering device (e.g., a speaker system, a headphone system, or an earbud system; not shown), and a dedicated network device (not shown).

Users 1026, 1028, 1030, 1032 may access computer system 1000 directly through network 1002 or through secondary network 1006. Further, computer system 1000 may be connected to network 1002 through secondary network 1006, as illustrated with link line 1034.

The various client electronic devices (e.g., client electronic devices 1018, 1020, 1022, 1024) may be directly or indirectly coupled to network 1002 (or network 1006). For example, personal computing device 1018 is shown directly coupled to network 1002 via a hardwired network connection. Further, machine vision input device 1024 is shown directly coupled to network 1006 via a hardwired network connection. Audio input device 1022 is shown wirelessly coupled to network 1002 via wireless communication channel 1036 established between audio input device 1020 and wireless access point (i.e., WAP) 1038, which is shown directly coupled to network 1002. WAP 1038 may be, for example, an IEEE 802.11a, 802.11b, 802.11g, 802.11n, Wi-Fi, and/or any device that can establish wireless communication channel 1036 between the audio input device 1020 and WAP 1038. Display device 1022 is shown wirelessly coupled to network 1002 via wireless communication channel 1040 established between display device 1022 and WAP 1042, which is shown directly coupled to network 1002.

The various client electronic devices (e.g., client electronic devices 1018, 1020, 1022, 1024) may each execute an operating system, wherein the combination of the various client electronic devices (e.g., client electronic devices 1018, 1020, 1022, 1024) and computer system 1000 may form modular system 1044.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit." "module" or "system." Furthermore, the present disclosure may take the form of a computer program product on a computer-usable storage medium having computer-usable program code embodied in the medium.

Any suitable computer-usable or computer-readable medium may be used. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. On the other hand, the computer program code for carrying out operations of the present disclosure may also be written in conventional procedural programming languages, such as C or similar. The program code may be executed entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described to best explain the principles of the disclosure and the practical application, and to enable others of ordinary skill in the art to understand the disclosure for various embodiments with various modifications as are suited to the particular use contemplated.

Several implementations have been described. Having thus described the disclosure of the present application in detail and by reference to embodiments thereof, it will be apparent that modifications and variations are possible without departing from the scope of the disclosure defined in the appended claims.

What is claimed is:

1. A method comprising:

receiving a multichannel audio signal from a multichannel audio frontend that includes a plurality of microphones, the multichannel audio signal including spatial information associated with the multichannel audio frontend;

processing the multichannel audio signal using a short-time discrete cosine transform (STDCT) to generate a real-valued spectral representation of the multichannel audio signal, the spatial information associated with the multichannel audio frontend being encoded within the real-valued spectral representation of the multichannel audio signal;

generating magnitude- and phase-dependent weights associated with the real-valued spectral representation of the multichannel audio signal and the spatial information encoded therein;

generating a single-channel representation of the multichannel signal based upon, at least in part, the spectral representation of the multichannel audio signal and the magnitude- and phase-dependent weights;

generating, by a neural network, direction of arrival (DOA) information based on the magnitude- and phase-dependent weights; and transmitting the single-channel representation of the multichannel signal, along with metadata that includes the DOA information, to a cloud device, wherein the cloud device includes an automatic speech recognition (ASR) model configured to perform speech recognition on the single-channel representation of the multichannel signal, and wherein the cloud device is configured to use the DOA information for speaker localization or diarization to improve the speech recognition performance of the ASR model.

2. The method of claim 1, wherein the STDCT comprises a modified discrete cosine transform (MDCT).

3. The method of claim 2, wherein the MDCT comprises one of a floating point MDCT and an integer MDCT.

4. The method of claim 2, further comprising generating direction of arrival information for the multichannel signal based on, at least in part, the magnitude- and phase-dependent weights.

5. The method of claim 1, further comprising performing an inverse DCT on the single-channel representation to obtain an audio signal representation of the multichannel audio signal.

6. The method of claim 1, further comprising:

encoding the single-channel representation signal prior to transmission of the single-channel representation signal over a transmission channel.

7. The method of claim 1, wherein the single-channel representation of the multichannel signal is further based upon a direction of arrival (DOA) of the signal.

8. The method of claim 1, further comprising:

transmitting the single-channel representation of the multichannel signal to an automatic speech recognition (ASR) backend configured for single-channel speech recognition.

9. A system comprising:

one or more processors; and a memory storing programming instructions for execution by the one or more processors, the programming instructions, upon execution by the one or more processors, causing the system to perform the following operations:

receiving a multichannel audio signal from a multichannel audio frontend that includes a plurality of microphones, the multichannel audio signal including spatial information associated with the multichannel audio frontend;

processing the multichannel audio signal using a short-time discrete cosine transform (STDCT) to generate a real-valued spectral representation of the multichannel audio signal, the spatial information associated with the multichannel audio frontend being encoded within the real-valued spectral representation of the multichannel audio signal;

generating magnitude- and phase-dependent weights associated with the real-valued spectral representation of the multichannel audio signal and spatial information encoded therein;

generating a single-channel representation of the multichannel signal based upon, at least in part, the spectral representation of the multichannel audio signal and the magnitude- and phase-dependent weights;

generating, by a neural network, direction of arrival (DOA) information based on the magnitude- and phase-dependent weights; and transmitting the single-channel representation of the multichannel signal, along with metadata that includes the DOA information, to a cloud device, wherein the cloud device includes an automatic speech recognition (ASR) model configured to perform speech recognition on the single-channel representation of the multichannel signal, and wherein the cloud device is configured to use the DOA information for speaker localization or diarization to improve the speech recognition performance of the ASR model.

10. The system of claim 9, wherein the STDCT comprises a modified discrete cosine transform (MDCT).

11. The system of claim 10, wherein the MDCT comprises one of a floating point MDCT and an integer MDCT.

12. The system of claim 9, wherein the programming instructions further cause the system to perform the following operation:

generating direction of arrival information for the multichannel signal based on, at least in part, the magnitude- and phase-dependent weights.

13. The system of claim 9, wherein the programming instructions further cause the system to perform the following operation:

performing an inverse STDCT on the single-channel representation to obtain an audio signal representation of the multichannel audio signal.

14. The system of claim 9, wherein the programming instructions further cause the system to perform the following operation:

encoding the single-channel representation signal prior to transmission of the single-channel representation signal over a transmission channel.

15. A computer program product residing on a non-transitory computer readable medium having programming instructions stored thereon which, when executed by one or more processors of a system, cause the system to perform the following operations comprising:

receiving a multichannel audio signal from a multichannel audio frontend that includes a plurality of microphones, the multichannel audio signal including spatial information associated with the multichannel audio frontend;

processing the multichannel audio signal with a modified discrete cosine transform (MDCT) to generate a spectral representation of the multichannel audio signal, the spatial information associated with the multichannel audio frontend being encoded within the spectral representation of the multichannel audio signal;

generating magnitude- and phase-dependent weights associated with the spectral representation of the multichannel audio signal and spatial information encoded therein;

generating a single-channel representation of the multichannel signal based upon, at least in part, the spectral representation of the multichannel audio signal and the magnitude- and phase-dependent weights;

generating, by a neural network, direction of arrival (DOA) information based on the magnitude- and phase-dependent weights; and transmitting the single-channel representation of the multichannel signal, along with metadata that includes the DOA information, to a cloud device, wherein the cloud device includes an automatic speech recognition (ASR) model configured to perform speech recognition on the single-channel representation of the multichannel signal, and wherein the cloud device is configured to use the DOA information for speaker localization or diarization to improve the speech recognition performance of the ASR model.

16. The computer program product of claim 15, wherein the MDCT comprises one of a floating point MDCT and an integer MDCT.

17. The computer program product of claim 15, further comprising generating direction of arrival information for the multichannel signal based on, at least in part, the magnitude- and phase-dependent weights.

18. The computer program product of claim 15, wherein the programming instructions further cause the system to perform the following operation:

performing an inverse MDCT on the single-channel representation to obtain an audio signal representation of the multichannel audio signal.

* * * * *